United States Patent
Kortmeyer et al.

(10) Patent No.: US 11,130,854 B2
(45) Date of Patent: *Sep. 28, 2021

(54) ROOFING COMPOSITIONS COMPRISING HIGH DENSITY POLYETHYLENE

(71) Applicant: JOHNS MANVILLE, Denver, CO (US)

(72) Inventors: Jordan Kortmeyer, Parker, CO (US); Lichih R Peng, Littleton, CO (US)

(73) Assignee: Johns Manville, Denver, CO (US)

( * ) Notice: Subject to any disclaimer, the term of this patent is extended or adjusted under 35 U.S.C. 154(b) by 405 days.

This patent is subject to a terminal disclaimer.

(21) Appl. No.: 16/149,550

(22) Filed: Oct. 2, 2018

(65) Prior Publication Data

US 2019/0106559 A1    Apr. 11, 2019

Related U.S. Application Data

(63) Continuation-in-part of application No. 15/727,782, filed on Oct. 9, 2017, now Pat. No. 10,844,200.

(51) Int. Cl.
| | |
|---|---|
| *C08L 23/16* | (2006.01) |
| *C08K 3/22* | (2006.01) |
| *C08K 5/00* | (2006.01) |
| *C08L 23/06* | (2006.01) |
| *C08L 23/12* | (2006.01) |
| *C08L 23/14* | (2006.01) |
| *E04D 5/06* | (2006.01) |

(52) U.S. Cl.
CPC ............... *C08L 23/16* (2013.01); *C08K 3/22* (2013.01); *C08K 5/0066* (2013.01); *C08L 23/06* (2013.01); *C08L 23/12* (2013.01); *C08L 23/142* (2013.01); *E04D 5/06* (2013.01); *C08K 2003/2241* (2013.01); *C08L 2205/03* (2013.01); *C08L 2207/04* (2013.01); *C08L 2207/062* (2013.01)

(58) Field of Classification Search
CPC .......... C08L 23/16; C08L 23/06; C08L 23/12; C08L 23/142; C08L 2205/03; C08L 2207/04; C08L 2207/062; C08K 3/22; C08K 5/0066; C08K 2003/2241; E04D 5/06
USPC ........................................................ 524/528
See application file for complete search history.

(56) References Cited

U.S. PATENT DOCUMENTS 10,844,200 B2 * 11/2020 Kortmeyer .............. C08L 23/10

OTHER PUBLICATIONS

D'Orazio et al., "Linear Polyethylene/Polypropylene/Ethylene-Propylene Copolymer Ternary Blends", (Polymer Blends, vol. 2, Springer Science + Business Media, New York, 1984, pp. 111-141). (Year: 1984).*

Gahleitner et al., "Effects of the Catalyst System on the Crystallization of Polypropylene", (J. Appl. Polym. Sci., vol. 73, pp. 2507-2515, 1999) . (Year: 1999).*

Ahmed et al., "Crystallization and melting behavior of i-PP: a perspective from Flory's thermodynamic equilibrium theory and DSC experiment", (RSC Adv., 2017, 7, pp. 42491-42504). (Year: 2017).*

* cited by examiner

*Primary Examiner* — Ling Siu Choi
*Assistant Examiner* — Ronald Grinsted
(74) *Attorney, Agent, or Firm* — Robert D. Touslee

(57) ABSTRACT

Provided is a polymer blend composition comprising high density polyethylene, a propylene polymer having rubber dispersed therein, and a propylene/ethylene copolymer. In one embodiment, there is provided a polymer blend composition comprising from 20 to 55 weight percent of the high density polyethylene, from 20 to 55 weight percent of a propylene polymer having from 10-60% crystallinity, and a propylene/ethylene copolymer comprising the remainder of the composition.

22 Claims, 4 Drawing Sheets

ROOFING COMPOSITIONS COMPRISING HIGH DENSITY POLYETHYLENE

CROSS REFERENCE TO RELATED APPLICATIONS

The present application is a continuation-in-part of U.S. Ser. No. 15/727,782, filed Oct. 9, 2017, to which application priority is claimed and the content of which is incorporated herein by reference in its entirety.

FIELD OF INVENTION

Formulations are provided which are useful in roofing applications. High density polyethylene is blended with thermoplastic olefin (TPO) polymers, which blend can be used to prepare a roofing membrane of enhanced properties.

BACKGROUND OF THE INVENTION

Compositions and membranes comprising thermoplastic olefin (TPO) polymers have found widespread use in the roofing industry for commercial buildings. For roofing and other sheeting applications, the products are typically manufactured as membrane sheets. The sheets are typically sold, transported, and stored in rolls. For roofing membrane applications, several sheets are unrolled at the installation site, placed adjacent to each other with an overlapping edge to cover the roof and are sealed together by a heat welding process during installation. During transport and storage, the rolls can be exposed to extreme heat conditions, such as from 40° C. to 100° C., which can lead to roll blocking of the rolls during storage in a warehouse. After installation, the membranes can be exposed during service to a wide range of conditions that may deteriorate or destroy the integrity of the membrane. As such, a membrane is desired that can withstand a wide variety of service temperatures, with a particular focus on thermal stability.

Thermoplastic olefin roofing membranes require high flexibility together with good mechanical stability at elevated temperatures, and high weathering resistance. A number of proposals for thermoplastic olefin films of this type are disclosed in the following publications.

US 2006/0046084 describes a thermoplastic polyolefin roofing membrane produced from a mixture of a polypropylene-based elastomer (PBE) and polyolefin copolymers.

US 2010/0255739 describes a roofing membrane with a composition comprising a propylene-based elastomer.

US 2010/0197844 describes a thermoplastic olefin membrane for use in construction materials which comprises a polypropylene-based elastomer.

PCT Publication WO 2010/0115079A1 is directed to roofing membranes that contain compositions comprising a propylene based elastomer and an impact propylene-ethylene copolymer. The propylene based elastomer was Vistamaxx™ 6102.

PCT Publication WO 2014/001224A1 is directed to compositions comprising 40 to 75 wt % of at least one polypropylene-based elastomer and around 25 to 60 wt % of at least one random copolymer of polypropylene. The polypropylene-based elastomers used in WO 2014/01224A1 were Vistamaxx™ 3980, 6102, and 6202.

PCT Publication WO 2014/040914A1 is directed to thermoplastic mixtures that comprise at least one impact-resistant polypropylene copolymer and at least one ethylene-1-octene copolymer, where the weight ratio of impact-resistant polypropylene copolymer to ethylene-1-octene copolymer is in the range of 35:65 to 65:35.

U.S. Patent Ser. No. 62/121,230, filed on Feb. 26, 2015, is directed to a roofing membrane composition of a 10-50 wt % of a propylene-based elastomer, 5-40 wt % of a thermoplastic resin, at least one flame retardant, and at least one ultraviolet stabilizer.

U.S. Pat. No. 9,434,827 discloses a composition which is useful in roofing membranes that comprises on a polymer basis, from 40 to 75% by weight of at least one propylene based elastomer; and 25 to 60% by weight of at least one random polypropylene copolymer.

In traditional mixtures, an at least semicrystalline polyolefin material such as polyethylene or polypropylene, which provides the mechanical strength and resistance to temperature change, is mixed with a flexible blend component. This flexible blend component is miscible, or at least compatible, with the polyolefin. Flexible blend components used to date include, ethylene-propylene-diene rubber (EPDM), ethylene-n-alk-ene copolymers, and also polypropylene-based elastomers. At present, the most common TPO polymer used in roofing membranes is Hifax™ CA10A, which is a polypropylene random copolymer matrix with EP rubber well dispersed throughout the polypropylene phase. However, improvements and cost efficiency are still needed.

There still remains a need for roofing membranes that demonstrate flexibility at service temperatures, particularly elevated temperatures. There is also a need for more economical roofing membranes which can meet such elevated temperature requirements.

SUMMARY

In one embodiment, provided is a polymer blend composition comprising high density polyethylene, a propylene polymer (preferably having rubber dispersed therein), and a propylene/ethylene copolymer.

In another embodiment, there is provided a polymer blend composition comprising from 20 to 55 weight percent of the high density polyethylene, from 20 to 55 weight percent of the propylene polymer having rubber dispersed therein, and a propylene/ethylene copolymer comprising the remainder of the composition. In one embodiment the propylene/ethylene copolymer comprises from 3 to 50 weight percent of the polymer blend composition.

The foregoing polymer blends are useful in preparing a roofing membrane. The roofing membrane would be prepared from a membrane composition comprising a polymer blend of the present invention in an amount ranging from 40 to 85 wt % of the composition, and will generally include additives e.g., at least one flame retardant, at least one ultraviolet stabilizer and at least one pigment.

Among other factors, it has been surprisingly discovered that combining high density polyethylene with a thermoplastic polyolefin (TPO), particularly using the present polymer blends, an economical TPO membrane with improved high temperature thermal stability can be obtained. This is achieved without modifying or changing the stabilizer package. Adding the high density polyethylene to the formulation has also been discovered to reduce the tackiness of the formulation. This increases the process ability of the material by keeping the films or layers from sticking to a calendar roll during the lamination of the TPO roofing membrane.

DETAILED DESCRIPTION

Figure 1:
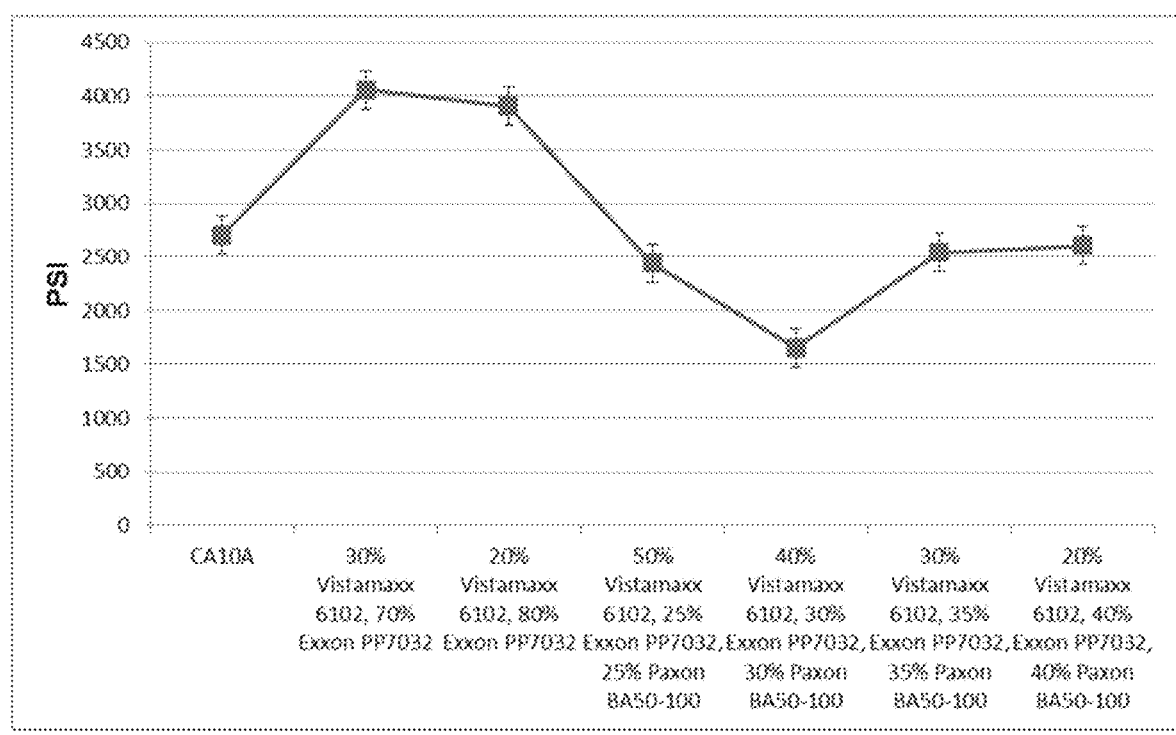
FIG. 1 graphically depicts the tensile strength of various polymer blends as compared with the current TPO resin (CA10A) used by the TPO roofing market.

High density polyethylene (HDPE) is well known in the polymer industry and is readily available commercially. HPDE is known for its large strength-to-density ratio. The density of HDPE can range from 0.93 to 0.97 g/cm$^3$. Although the density of HDPE is only marginally higher than that of low-density polyethylene, HDPE has little branching, giving it stronger intermolecular forces and tensile strength than LDPE. The difference in strength exceeds the difference in density, giving HDPE a higher specific strength.

The present invention provides an economical polymer blend that is useful in roofing membranes that exhibit excellent high temperature thermal stability as well as reduced tackiness. These advantages are unprecedented and offer the industry a solution to its quest for a more economical yet better performing roofing membrane. These advantages have been discovered by combining high density polyethylene with the more traditional thermoplastic polyolefin polymers. The high density polyethylene substitutes for some of the polyolefin polymers used in conventional roofing membrane polymer blends in a manner which allows phase stability. Maintaining phase stability is important, otherwise the physical properties and stability of the finished article are adversely affected. To the contrary, the right balance of high density polyethylene has been found to insure phase stability, without changing or modifying the stabilizer package, while also providing a final product of improved performance. The improved performance is particularly evident in thermal stability, and maintaining that thermal stability over time.

The polymer blend of the present invention comprises three components. High density polyethelene (HDPE) is one component. The density of the HDPE can range from 0.93 to 0.97 g/cm3, but is generally in the range of from 0.94 to 0.96 g/cm3. The HDPE also generally has a melt index of about 0.05 to 11, and in one embodiment the melt index ranges from about 7 to 11. The polymer blend generally comprises from 20 to 55 weight percent of HDPE, based on the weight of the blend. In one embodiment, the polymer blend comprises from 25 to 55 weight percent of HDPE, and in another embodiment, from 20-35 weight percent. The polymer blend can also comprise from 25-35 weight percent of the HDPE.

High density polyethylene which meets the foregoing requirements is available commercially. For example, such HDPE is available from Ineos Olefins & Polymers, USA, of League City, Tex. and from Formosa Plastic Corp., U.S.A. of Livingston, N.J. HDPE resins are also available from ExxonMobil Chemical Company, for example Exxon BA5O-100, or under the Paxon™ brand name.

The second component is a propylene polymer having a crystallinity of from 10-60%. Such resin components are well known. The propylene polymer can be a random copolymer, an impact polymer, or homopolymer. The random propylene polymer generally exhibits a crystallinity of from 15-40%. The impact propylene polymer generally exhibits a crystallinity of from 15-40%. The propylene homopolymer can have a crystallinity of from 10-60%.

In one embodiment, the propylene polymer having a crystallinity of from 10-60% is a propylene polymer having rubber dispersed therein. Such polymers are well known. For example, Hifax™ CA10A, available from LyondellBasel Industries of Arlington, Va. The Hifax CA10A resin is a polypropylene matrix with EP rubber as the majority phase, the rubber well dispersed in the polypropylene. The rubber phase is finely and uniformly distributed throughout the polypropylene phase. The polypropylene phase is a random copolymer of polypropylene/polyethylene. Another commercial and useful propylene polymer having rubber dispersed therein is available from ExxonMobil Chemical Company under the tradename ExxonMobile™PP. One specific product is ExxonMobil™PP7032. This second component can also be referred to as a propylene impact copolymer, or an ICP.

The amount of the second component in the polymer blend generally ranges from 20 to 55 weight percent, based on the weight of the blend. In one embodiment, the amount ranges from 25 to 55 weight percent, and in another embodiment, from 20-35 weight percent. The polymer blend can also comprise from 25-35 weight percent of the second component—the propylene polymer component.

The propylene polymer component generally has a crystallinity of from 10-60%, more likely 15 to 40%. The propylene polymer component generally has a density that ranges from 0.87 to 0.92 g/cm$^3$, with a density in the range of from 0.88 to 0.91 in one embodiment. The melt flow rate of the propylene polymer component is generally in the range of from 0.5 to 20 g/10 min, and in one embodiment the melt flow ranges from 0.5 to 5.0 g/10 min. A melt flow rate in the range of from 0.6 to 4.0 g/10 min is exhibited in one embodiment.

The third component is a propylene/ethylene copolymer. This component is generally used in the blend in an amount ranging from 3 to 50 weight percent, based on the weight of the blend. In one embodiment, the amount of the propylene/ethylene in the blend ranges from 30 to 50 weight percent. The exact amount used can depend on the second component and its crystallinity, and how much rubber is dispersed in the polypropylene. When the amount of rubber in the second component is from 30-40% by weight, such as for ExxonMobil™ PP7032, the amount of the third component should be in the range of from 30-50 wt % of the polymer blend. However, when the amount of rubber in the second component ranges about 80 wt % or higher, such as in CA10A, then the amount of the third component successfully can range anywhere from 3-50% wt % of the polymer blend.

This third component is generally used as a compatabilizer in the blend, to aid in maintaining the blend and maintaining phase stability. The ethylene content of the copolymer can range from 15 to 95 weight percent of the polymer.

Suitable propylene/ethylene copolymers commercially available include Vistamaxx™ copolymers from ExxonMobil Chemical Company. For example, Vistamaxx™ 6102 may be used. Infuse™ olefin copolymers available from Dow Chemical and Engage™ polyolefin elastomers from Dow Chemical can also be successfully used.

The blend of polymers can be prepared by physically blending the different components. The blend is therefore a combination of polymer components that have already been formed and recovered before mixing or otherwise combined. The blending can also occur somewhat in solutions, miscible carriers, or by melt blending. The resulting blend is a multiphase polymer composition.

The balance of components in the blend is important because polypropylene and polyethylene will not maintain phase stability if the mix is not balanced. Instead, regions of polypropylene and polyethylene will form, which will affect the physical properties and stability of the finished article adversely. However, by maintaining the components in the range of from 20 to 55 wt HDPE; 20 to 55 wt % of the second component and 3 to 50 wt % of the third component, a polymer blend including HDPE is obtained which maintains phase stability and provides even improved heat stability. The blend has also allowed improved processing properties. For example, the blend of the present invention can be pelletized without cryogenics, which is not the case when only the second and third components are mixed. Cost efficiency is also realized by the present blend, while still achieving improved performance characteristics.

Once the polymer blend has been achieved, and often pelletized, the blend can be used to prepare a membrane for use in a roof. Generally, a membrane composition is prepared where certain additives and fillers are added to the polymer blend. In one embodiment, at least one flame retardant, at least one ultraviolet stabilizer and at least one pigment is added to the polymer blend. This prepares a membrane composition of from 40-85 wt % of the polymer blend, based on the weight of the entire composition, with the remaining components comprising at least one flame retardant, ultraviolet stabilizer and pigment. In one embodiment, a membrane composition comprising from 40-75 wt % polymer blend, based on the weight of the entire membrane composition, is prepared. The flame retardant can be present, in one embodiment, in an amount ranging from 20 to 40 wt %, and the pigment in an amount of about 5 wt %. The pigment often used is $TiO_2$.

As noted above, the compositions described herein can also incorporate a variety of additives. The additives may include reinforcing and non-reinforcing fillers, antioxidants, stabilizers, processing oils, compatibilizing agents, lubricants (e.g., oleamide), antiblocking agents, antistatic agents, waxes, coupling agents for the fillers and/or pigment, pigments, flame retardants, antioxidants, and other processing aids known to the art. In some embodiments, the additives may comprise up to about 60 wt %, or up to about 55 wt %, or up to about 50 wt % of the roofing membrane composition. In some embodiments, the additives may comprise at least 25 wt %, or at least 30 wt %, or at least 35 wt %, or at least 40 wt % of the roofing membrane composition.

In some embodiments, the roofing membrane composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the roofing composition may include flame retardants, such as calcium carbonate, inorganic clays containing water of hydration such as aluminum trihydroxides ("ATH") or magnesium hydroxide. For example, the calcium carbonate or magnesium hydroxide may be pre-blended into a masterbatch with a thermoplastic resin, such as polypropylene, or a polypropylene/polyethylene copolymer. For example, the flame retardant may be pre-blended with a polypropylene, or an impact polypropylene-ethylene copolymer, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch may then form at least 5 wt %, or at least 10 wt %, or at least 15 wt %, or at least 20 wt %, or at least 25 wt %, of the roofing composition. In some embodiments, the roofing composition comprises from 5 wt % to 40 wt %, or from 10 wt % to 35 wt %, or from 15 wt % to 30 wt flame retardant masterbatch, where desirable ranges may include ranges from any lower limit to any upper limit.

In some embodiments, the roofing composition may include UV stabilizers, such as titanium dioxide or Tinuvin® XT-850. The UV stabilizers may be introduced into the roofing composition as part of a masterbatch. For example, UV stabilizer may be pre-blended into a masterbatch with a thermoplastic resin, such as polypropylene. For example, the UV stabilizer may be pre-blended with a polypropylene or an impact polypropylene-ethylene copolymer, where the masterbatch comprises at least 5 wt %, or at least 7 wt %, or at least 10 wt %, or at least 12 wt %, or at least 15 wt %, of UV stabilizer, based on the weight of the masterbatch. The UV stabilizer masterbatch may then form at least 5 wt %, or at least 7 wt %, or at least 10 wt %, or at least 15 wt %, of the roofing composition. In some embodiments, the roofing composition comprises from 5 wt % to 30 wt %, or from 7 wt % to 25 wt %, or from 10 wt % to 20 wt % flame retardant masterbatch, where desirable ranges may include ranges from any lower limit to any upper limit.

Still other additives may include antioxidant and/or thermal stabilizers. In an exemplary embodiment, processing and/or field thermal stabilizers may include IRGANOX® B-225 and/or IRGANOX® 1010 available from BASF.

The compositions described herein are particularly useful for roofing applications, such as for thermoplastic polyolefin roofing membranes. Membranes produced from the compositions may exhibit a beneficial combination of properties, and in particular exhibit an improved balance of flexibility at temperatures across a wide range, along with stability at elevated temperatures such as those from 40° C. to 100° C. The roofing compositions described herein may be made either by pre-compounding or by in-situ compounding using polymer-manufacturing processes such as Banbury mixing or twin screw extrusion. The compositions may then be formed into roofing membranes. The roofing membranes may be particularly useful in commercial roofing applications, such as on flat, low-sloped, or steep-sloped substrates.

The roofing membranes may be fixed over the base roofing by any means known in the art such as via adhesive material, ballasted material, spot bonding, or mechanical spot fastening. For example, the membranes may be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane may also be fully adhered or self-adhered to an insulation or deck material using an adhesive. Insulation is typically secured to the deck with mechanical fasteners and the flexible membrane is adhered to the insulation.

In one embodiment, the roofing membrane can comprise more than one layer. For example, the membrane can comprise a cap or top layer, and a core or lower layer. While the polymer composition of each of the layers is essentially the same, the additives may vary. The cap layer is directed to UV protection and therefore may contain a greater UV stabilizer concentration than the core layer. The core layer can be designed for more heat protection, and therefore contain more antioxidants than the cap layer. Each layer provides a separate focused function based on the additives present, but with the polymer composition being within that of the present invention so that the benefits of the present invention as described above can be realized.

The following Examples are provided to further illustrate certain embodiments of the present invention, but the Examples are not intended to be limiting.

EXAMPLES

The blend formulations in the Examples were prepared as noted in the following Tables, which blend formulations were then pelletized and fed to an extruder with additives to prepare an extruded membrane:

Resin pellets of the polymer blends were fed into a co-rotating twin screw extruder using individual weight loss feeder or they were pre-blended using a ribbon blender and fed into the extruder using one weight loss feeder. Filler, i.e., magnesium hydroxide, and pigment, i.e., $TiO_2$, was fed into the extruder using a side screw feeder. Stabilizers, i.e., a stabilizing package of a high MW polymeric hindered amine light stabilizer, a low MW polymeric hindered amine light stabilizer, a phenolic antioxidant and a phosphite antioxidant, were premixed using a ribbon blender, and the chemical blend was fed into the extruder using a weight loss feeder. The extruder had a length to diameter ratio of 40:1. Extruder heat temperature was between 390 to 410° F. The screw rpm's was between 285 to 310.

Example 1

The following sample formulations A-E were prepared based on the three components and their amounts in weight percent as set forth in the Tables below:

TABLE 1

| Blend Components | Samples # | | |
|---|---|---|---|
| | A wt % | B wt % | C wt % |
| HDPE (Exxon BA50-100) | 41.3 | 50.6 | 50.6 |
| Polypropylene Polymer (CA10A) | 51.2 | 38.1 | 45.6 |
| Proprylene/Ethylene (Infuse 9107) | 7.5 | 11.3 | 3.8 |

TABLE 2

| Blend Components | Sample # | |
|---|---|---|
| | D wt % | E wt % |
| HDPE (Ineos G50-100) | 48.1 | 48.1 |
| Propylene Polymer (CA10A) | 48.1 | 40.6 |
| Propylene/Ethylene (Infuse 9107) | 3.8 | 11.3 |

The foregoing formulations were then fed into an extruder with additives as discussed above, and extruded to form membranes. The tensile strength, elongation and modulus were tested for each of the membranes prepared. The tests run were pursuant to ASTM D412. Each of the membranes exhibited excellent properties suitable for a roofing membrane.

Example 2

Thirteen additional membranes were extruded using the polymer blends set forth in Table 3 below. The membranes (that could be tested) were tested for the performance characteristics of flexibility, tensile strength and elongation as in Example 1.

From a performance standpoint, the X formulations (Examples 2, 3, 4, 5, 8 and 9) with high amounts of Vistamax could not be processed through the extruder because they were too tacky to be made into good films for testing. It should be noted that when HDPE was included in the blend in accordance with the present concept, higher amounts of the propylene/ethylene polymer (the compatabilizer) can be used successfully. However, the amount still cannot approach 60 wt % or above.

Samples 6 and 7 were too stiff to be made into a useable roofing membrane. The modulus of the samples was above 20,000 psi. The modulus is best no greater than 20,000 psi. Sample 13, having only 20% Vistamaxx and 40% Exxon PP7032, also exhibited a modulus above 20,000 psi, and unacceptable stiffness. The samples (10-12) with from 25-35 wt % HDPE showed good flexibility, tensile and elongation for a roofing membrane. The elongation, elastic modulus (Young's modulus) and tensile strength for Examples 1, 6, 7 and 10-13 are graphically shown in FIGS. 1-3.

TABLE 3

| Sample # | EX1 | EX2 | EX3 | EX4 | EX5 | EX6 | EX7 | EX8 | EX9 | EX10 | EX11 | EX12 | EX13 |
|---|---|---|---|---|---|---|---|---|---|---|---|---|---|
| Number | | X | X | X | X | | | X | X | | | | |
| CA10A | 100.00 | 0.00 | 0.00 | 0.00 | 0.00 | 0.00 | 0.00 | 0.00 | 0.00 | 0.00 | 0.00 | 0.00 | 0.00 |
| Vistamaxx 6102 | 0.00 | 70.00 | 60.00 | 50.00 | 40.00 | 30.00 | 20.00 | 70.00 | 60.00 | 50.00 | 40.00 | 30.00 | 20.00 |
| Exxon PP7032 | 0.00 | 30.00 | 40.00 | 50.00 | 60.00 | 70.00 | 80.00 | 15.00 | 20.00 | 25.00 | 30.00 | 35.00 | 40.00 |
| Paxon BA50-100 | 0.00 | 0.00 | 0.00 | 0.00 | 0.00 | 0.00 | 0.00 | 15.00 | 20.00 | 25.00 | 30.00 | 35.00 | 40.00 |
| | 100.00 | 100.00 | 100.00 | 100.00 | 100.00 | 100.00 | 100.00 | 100.00 | 100.00 | 100.00 | 100.00 | 100.00 | 100.00 | a) Propylene/ethylene polymer;
b) Propylene polymer;
c) HDPE

Figure 2:
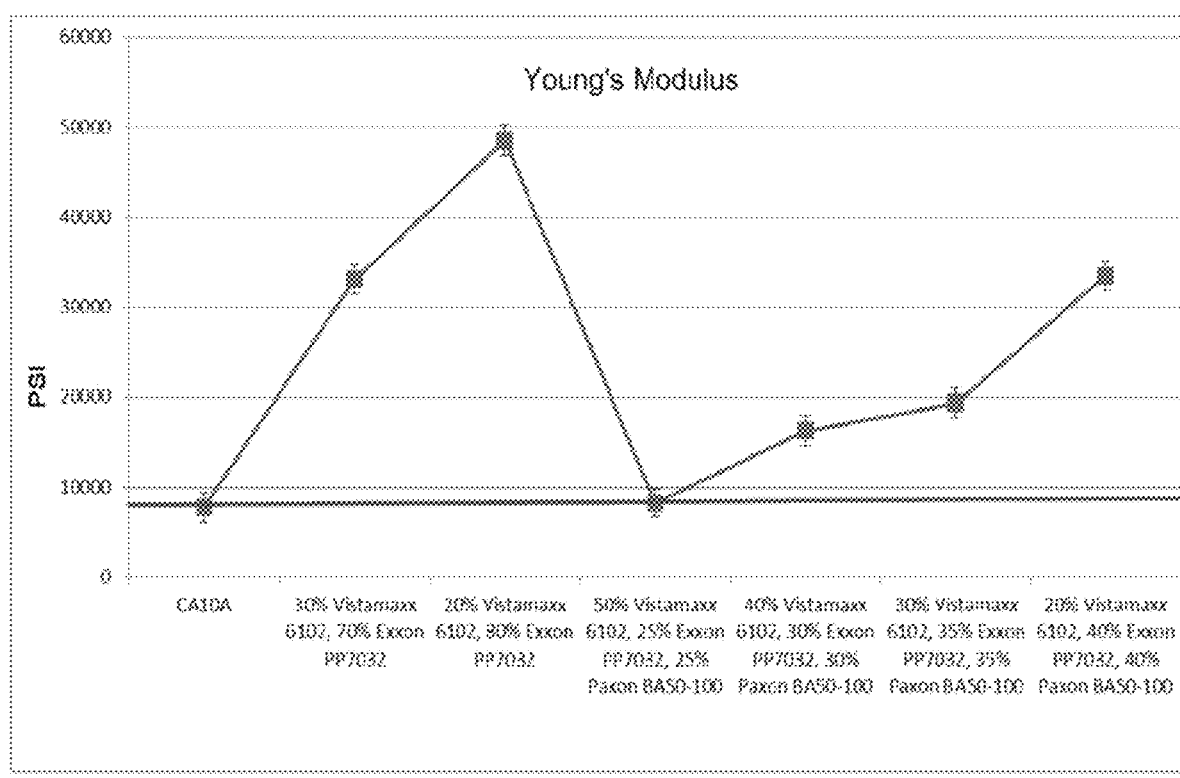
FIG. 2 graphically depicts the Young's Modulus of various polymer blends as compared with the current TPO resin (CA10A) used by the TPO roofing market.
Figure 3:
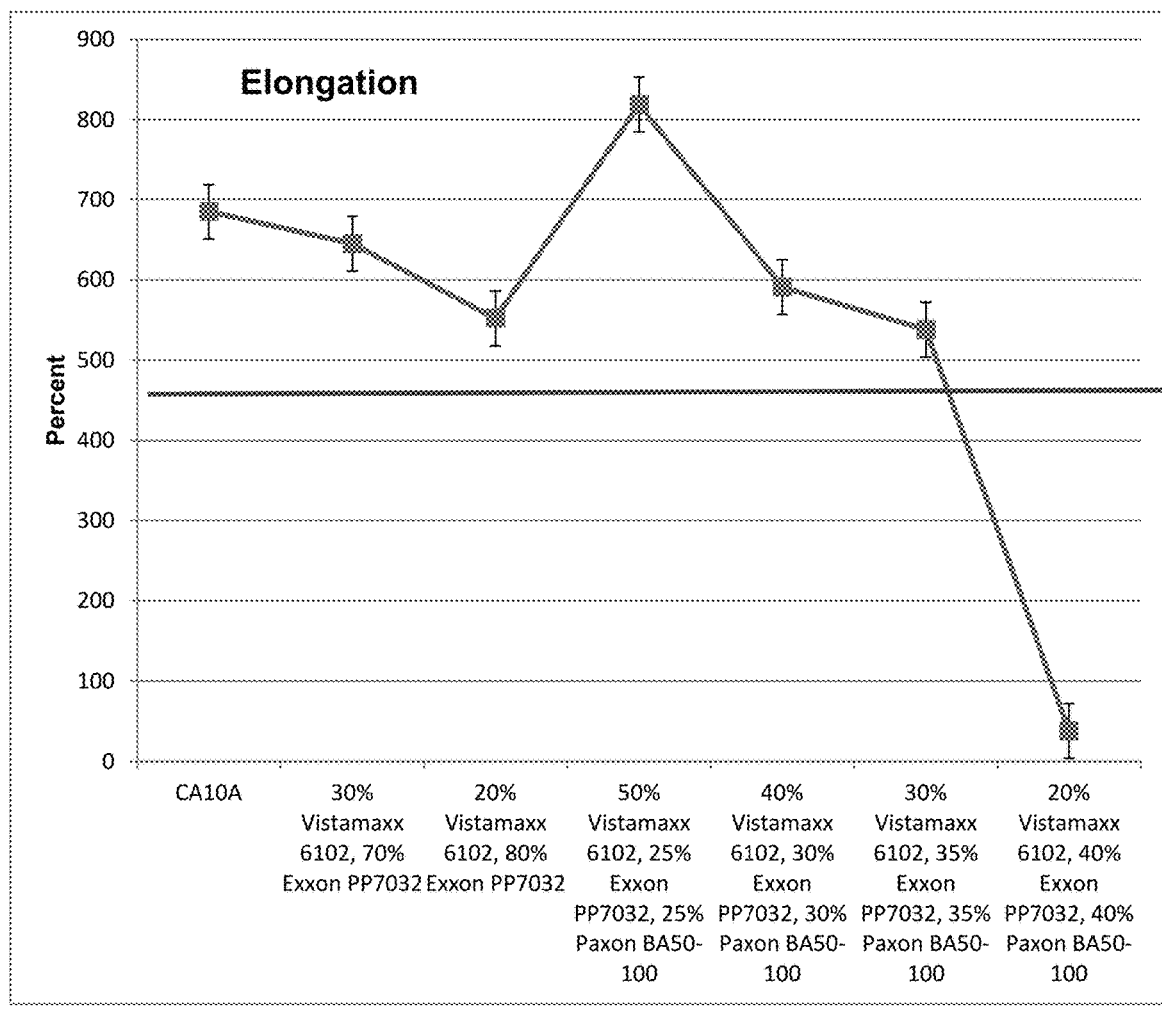
FIG. 3 graphically depicts the elongation of various polymer blends as compared with the current TPO resin (CA10A) used by the TPO roofing market.

FIGS. 1-3 demonstrate that the present three component compositions maintain the flexibility, tensile strength and elongation relative to the current reactor grade TPO resin (Hifax™ CA10A) used in the roofing market today.

Example 3

The heat aging test for graph 4 was conducted in the following manner: Three 1½"×1 15/16" test specimens were cut from the sample films. The test specimens were placed in pre-weighed aluminum pans and the initial weight was measured to the nearest 0.0001 g. After the initial weight was measured the specimens were placed in a pre-heated oven set to 275° F. for heat aging. Specimens were measured weekly for approximately 4 weeks. After 4 weeks the specimens were measured twice a week until failure. Failure was defined as either reaching a maximum weight loss of 1.5% or at the point where the specimens begin to rapidly lose weight. The three specimens of membranes tested were prepared from CA10A (rpp); the blend of Example 10 in Table 3 (ICP/Compatibilizer/HDPE) and the blend of Sample C from Table 1 (rpp/compatibilizer/HDPE).

Figure 4:
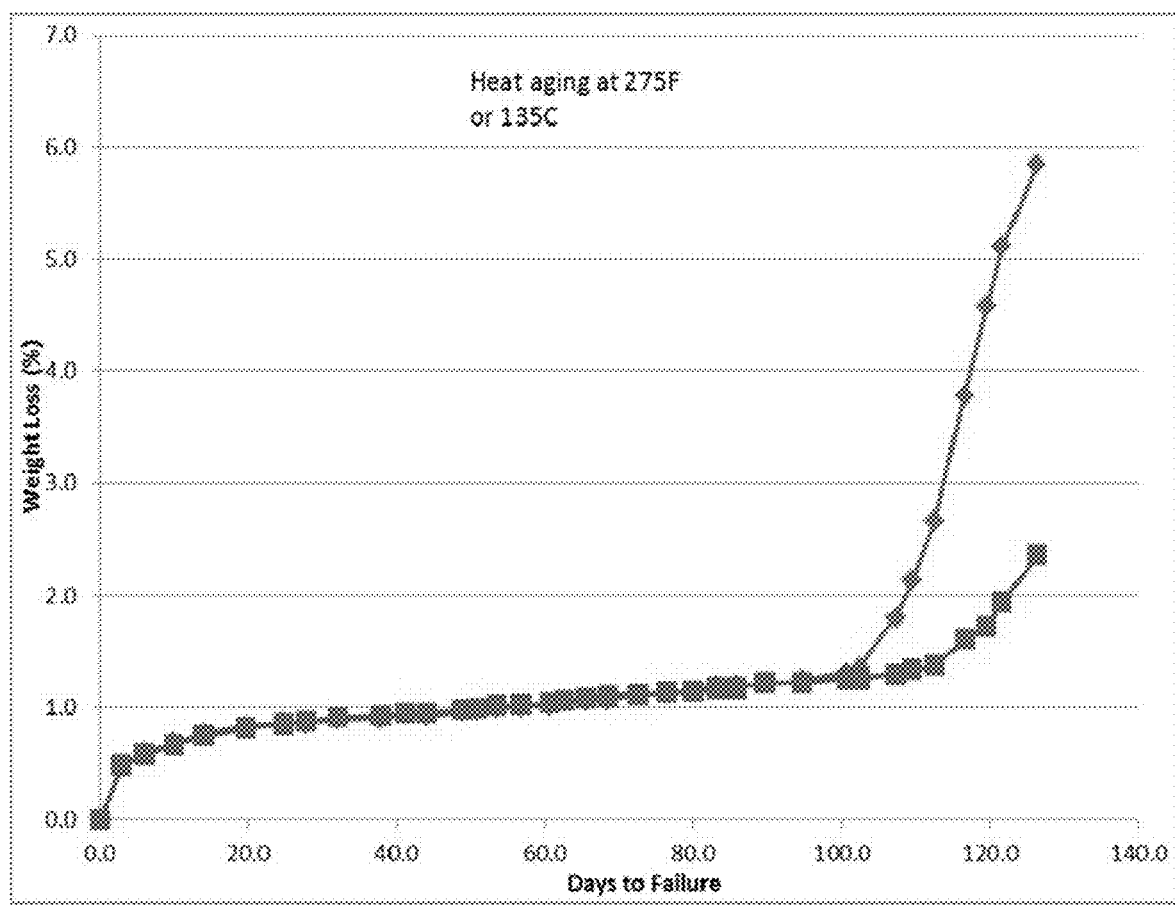
FIG. 4 depicts graphically the high temperature thermal stability over time of several polymer blends of the present invention compared with the current TPO resin (CA10A) used by the TPO roofing market.

FIG. 4 shows that improved high temperature thermal stability is achieved by the present membrane composition. The improvement is at least 19 percent over the current TPO membrane used in the roofing market today. The best thermal stability was exhibited by rpp/compatibilizer/HDPE, which is Sample C of Table 1.

Processing is also improved by using the present polymer blend in formulating membranes. The tackiness of the formulation is decreased due to the presence of the HDPE. This increases the process ability of the material by keeping the films or layers from sticking to calendar rolls during the lamination of the TPO membrane. Fire retardant or filler dispersion and processability are also better, which leads to an increase in extruder throughput, e.g., from 1200 lbs/hr to 1250 lb/hr, using the same rpm's and temperature profile.

Overall, the present polymer blend decreases the cost of roofing membranes. An economical alternative is thereby provided. The processing advantages also allow improved manipulation and more efficient processing. The quite surprising improved properties in heat stability most importantly lead to a better final product. Because of the higher heat stability, the roof will exhibit a longer life and better weatherability. The improved heat stability also allows for improved welding of the roofing membranes. Better welding also translates into a better roof, both in function and life. The seams will last longer and not pop-up because of the better seam welds. The present polymer blend provides a more economical and better roof membrane, which in turn provides a better roof.

While the foregoing is directed to embodiments of the present invention, other and further embodiments of the invention may be devised without departing from the basic scope thereof, and the scope thereof is determined by the claims that follow.

What is claimed is:

1. A polymer blend composition comprising:
    a) from 20 to 55 weight percent of a high density polyethylene, based on the weight of the polymer blend;
    b) from 20 to 55 weight percent of a propylene polymer having rubber dispersed therein and from 10-60% crystallinity, based on the weight of the polymer blend; and
    c) from 3 to 55 weight percent of a propylene/ethylene copolymer, based on the weight of the polymer blend.

2. The polymer blend composition of claim 1, wherein:
    a) the high density polyethylene has a melt index of about 0.05 to 11 g/10 min; and
    b) the propylene polymer has a melt flow rate of 0.5 to 20 g/10 min.

3. The polymer blend composition of claim 1, wherein:
    a) the density of the high density polyethylene ranges from about 0.94 to 0.96 g/cm3; and
    b) the density of the polypropylene polymer having from 10-60% crystallinity ranges from about 0.88 to 0.91 g/cm3.

4. The polymer blend composition of claim 1, wherein the propylene/ethylene copolymer c) has an ethylene content of from 15 to 95% based on the weight of the propylene/ethylene copolymer.

5. The polymer blend composition of claim 1, wherein the rubber dispersed within the propylene polymer of b) is an ethylene rubber.

6. The polymer blend composition of claim 2, wherein the high density polyethylene has a melt index of from 7 to 11.

7. The polymer blend composition of claim 2, wherein the propylene polymer has a melt flow rate of 0.5 to 5.0 g/10 min.

8. A polymer blend composition comprising:
    a) about 20 to 35 weight percent of high density polyethylene, based on the weight of the polymer blend, with the high density polyethylene having a density of about 0.94 to 0.96 g/cm3 and a melt index of about 7 to 11;
    b) about 20 to 35 weight percent of a propylene polymer having rubber dispersed therein, based on the weight of the polymer blend, and with the propylene polymer having a density of 0.88 to 0.91 g/cm3 and a melt flow rate of 1 to 5 g/10 min; and
    c) a compatibilizer comprising a propylene/ethylene copolymer.

9. The polymer blend composition of claim 8, wherein the compatibilizer of (c) comprises from 15 to 95 wt % ethylene content.

10. A membrane composition comprising:
    a) from about 40 wt % to 85 wt % of the polymer blend of claim 1, based on the weight of the membrane composition;
    b) at least one flame retardant;
    c) at least one ultraviolet stabilizer; and
    d) at least one pigment.

11. The membrane composition of claim 10, wherein the flame retardant comprises 20-40 wt % of the composition.

12. The membrane composition of claim 10, wherein the pigment comprises from 4 to 6 wt % of the composition.

13. The membrane composition of claim 10, wherein the pigment comprises TiO2.

14. A roofing membrane comprising the membrane composition of claim 10.

15. A roof comprising the roofing membrane of claim 14.

16. A method of preparing a thermoplastic polyolefin film, the method comprising forming a thermoplastic polyolefin film from the composition of claim 10.

17. The membrane composition of claim 10, comprising calcium carbonate.

18. The membrane composition of claim 17, comprising at least 25 wt % calcium carbonate.

19. The membrane composition of claim 10, wherein the amount of flame retardant, ultraviolet stabilizer and pigment comprise at least 25 wt % of the membrane composition.

20. A membrane composition comprising:
a) from about 40 wt % to 85 wt %, based on the weight of the membrane composition, of a polymer blend comprising:
   i) from 25 to 55 wt % of a high density polyethylene, based on the weight of the polymer blend;
   ii) from 25 to 55 wt % of a propylene polymer having from 10-60% crystallinity, based on the weight of the polymer blend; and
   iii) from 3 to 50 wt % of a propylene/ethylene copolymer, based on the weight of the polymer blend;
b) at least one flame retardant;
c) at least one ultraviolet stabilizer; and
d) at least one pigment.

21. A roofing membrane comprising the membrane composition of claim 20.

22. A roof comprising the roofing membrane of claim 21.

* * * * *